(12) United States Patent
Kim (10) Patent No.: US 6,512,558 B2
(45) Date of Patent: Jan. 28, 2003

(54) FLAT DISPLAY MODULE-HOUSING ASSEMBLY

(75) Inventor: Sung Kon Kim, Pusan-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/028,701

(22) Filed: Dec. 28, 2001

(65) Prior Publication Data

US 2002/0186526 A1 Dec. 12, 2002

(30) Foreign Application Priority Data

Jun. 11, 2001 (KR) .................................. 1-32613

(51) Int. Cl.[7] .................................. G02F 1/1335
(52) U.S. Cl. ............................................. 349/58
(58) Field of Search .......................................... 349/58

(56) References Cited

U.S. PATENT DOCUMENTS

| | | | | |
|---|---|---|---|---|
| 4,221,112 A | * | 9/1980 | Enomoto et al. ............ | 349/58 |
| 6,016,175 A | * | 1/2000 | Kim ............................ | 349/58 |
| 6,055,029 A | * | 4/2000 | Kurihara et al. ............. | 349/58 |
| 6,166,788 A | * | 12/2000 | Ha et al. ..................... | 349/58 |
| 6,229,695 B1 | * | 5/2001 | Moon ......................... | 349/58 |
| 6,292,239 B1 | * | 9/2001 | Nagamura et al. ........... | 349/58 |
| 6,295,103 B1 | * | 9/2001 | Yamatani et al. ............ | 349/58 |
| 6,392,724 B2 | * | 5/2002 | An et al. ..................... | 349/58 |

* cited by examiner

Primary Examiner—James Dudek
(74) Attorney, Agent, or Firm—Morgan, Lewis & Bockius LLP (57) ABSTRACT

A display module-housing assembly includes a flat display module for displaying images; a display housing having a front housing and a rear housing, the front housing being fitted to the front of the flat display module, and a rear housing being fitted to the rear of the flat display module; and a coupler for coupling the front housing to the rear housing to fix the flat display module directly between the front housing and the rear housing.

20 Claims, 9 Drawing Sheets

FLAT DISPLAY MODULE-HOUSING ASSEMBLY

This application claims the benefit of Korean Patent Application No. P 2001-32613, filed in Korea on Jun. 11, 2001, which is hereby incorporated by reference.

BACKGROUND OF THE INVENTION

1. Field of the Invention

The present invention relates to a flat display module-housing assembly, and more particularly, to a flat display module-housing assembly, in which the flat display module is fitted to a display housing of a display.

2. Discussion of the Related Art

Figure 1:
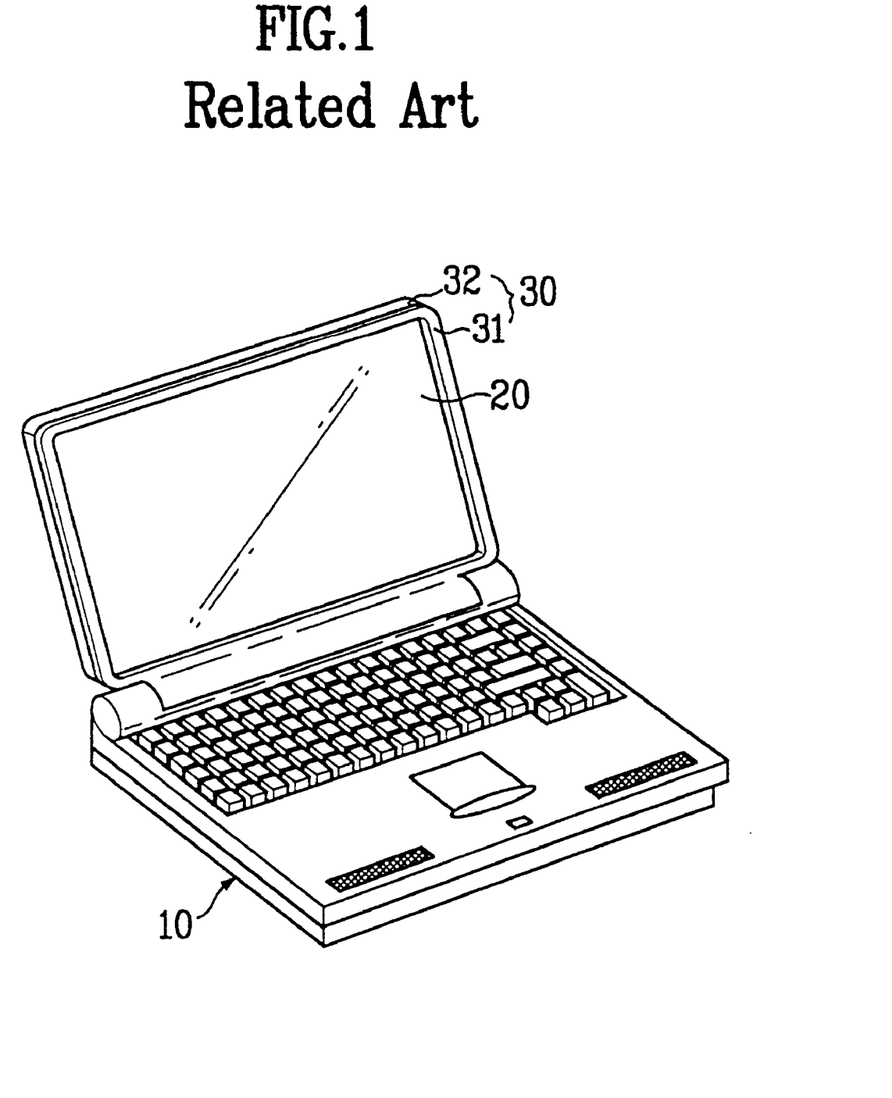
FIG. 1 is a perspective view of a related art notebook computer.

In general, display systems, such as notebook computers, monitors, and TV receivers, are equipped with display parts. For an example, as shown in FIG. 1, a notebook computer is provided with a body 10 having an input device and memory/operation devices therein, a display housing 30 rotatably mounted on the body 10, and a flat display panel 20 assembled in the display housing 30.

Figure 2:
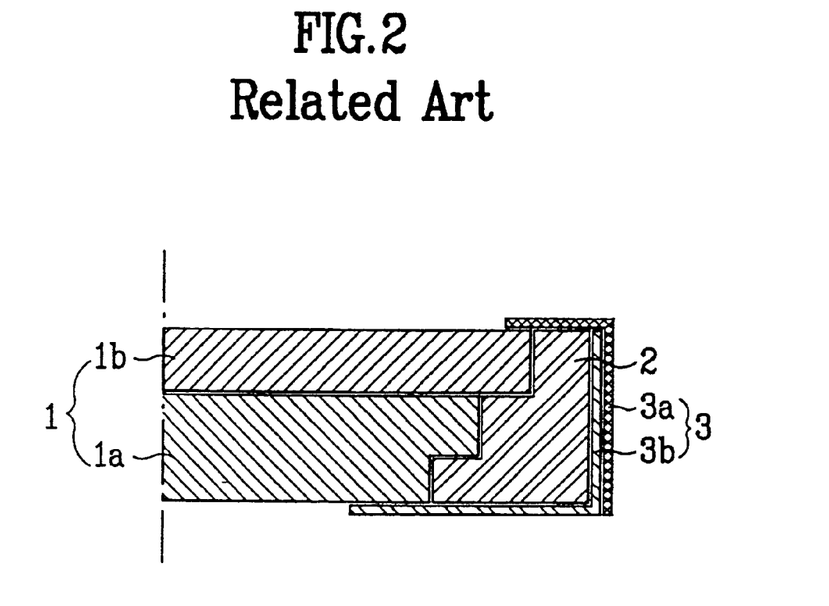
FIG. 2 is a section view of a peripheral part of a related art flat display panel with a related art flat display module case.

The flat display panel 20 assembled in the display housing 30 may be an LCD (Liquid Crystal Display), PDP (Plasma Display Panel), FED (Field Emission Display), or the like. For example, as shown in FIG. 2, a flat display panel 20 of FIG. 1 is provided with a flat display module 1 having a backlight part 1a for light emission and a liquid crystal panel part (or display part) 1b for displaying images upon reception of the light from the backlight part 1a, a frame 2 for holding the edges of the flat display module to maintain a required gap between the backlight part 1a and the liquid crystal panel part 1b, and a case part 3 having a front case 3a and a rear case 3b for assembling the display module and the frame 2 together. The liquid crystal panel displays images by utilizing molecular movements of liquid crystal in the liquid crystal panel part 1b. The flat display panel 20 cannot be used independently, and is used in an assembly with the display housing 30 of the display system.

Figure 3A:
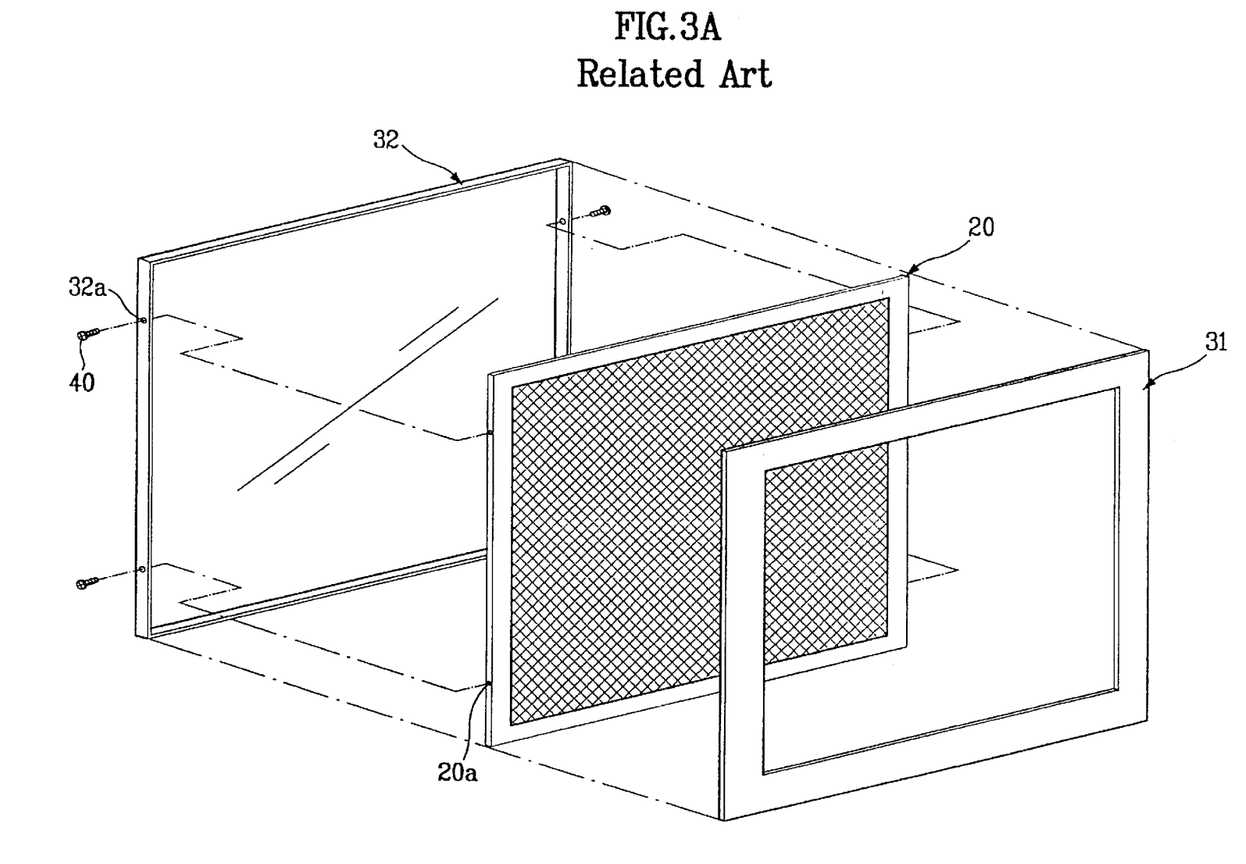
FIG. 3A is a perspective view of a flat display assembly in a disassembled condition, showing separated housings and a flat display panel according to the related art.
Figure 3B:
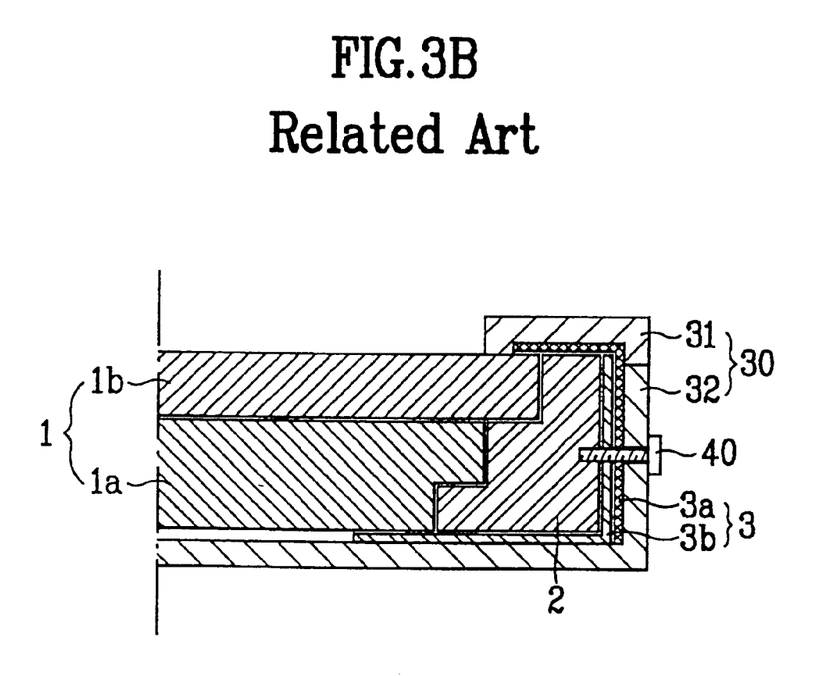
FIG. 3B is a section view of the flat display assembly according to the related art of FIG. 3A.

Various structures are possible for this assembly. An assembly structure of the flat display panel 20 and the display housing 30 according to the related art is as follows. Referring to FIGS. 3A and 3B, a flat display panel 20 is mounted on a rear housing 32 so that the sides of the flat display panel 20 are fixed to the corresponding sides of the rear housing 32. Then, a front housing 31 is fitted to the rear housing 32. Specifically, there are screw holes 20a and 32a in both sides of the flat display panel 20 and the rear housing 32, respectively, into which screws 40 are fastened, to mount the flat display panel 20 to the rear housing 32. Then, the front housing 31 is mounted on the rear housing 32.

Thus, in this assembly of the flat display panel and the display housing, the display module 1 is cased by the case 3 shown in FIG. 2, and subsequently cased by the display housing 30, as shown in FIG. 3B.

However, this assembly has the following disadvantages. The structure of the case 3 and the display housing 30 has a double casing structure and accordingly has undesirable redundancy. This redundant casing structure (or redundant box type structure) with the case 3 and the display housing 30 results in a large total thickness in the display housing 30. This is undesirable in view of the current trend of pursuing light weighted, thinner displays. Moreover, the fabrication of this double casing structure requires a longer fabrication time, and increases the product costs.

SUMMARY OF THE INVENTION

Accordingly, the present invention is directed to a flat display module-housing assembly that substantially obviates one or more of the problems due to limitations and disadvantages of the related art.

An object of the present invention is to provide a flat display module-housing assembly which can reduce the weight and thickness of a display system, improve workability, and reduce the production costs.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the display module-housing assembly according to one aspect of the present invention includes a flat display module for displaying images; a display housing having a front housing and a rear housing, the front housing being fitted to the front of the flat display module, and a rear housing being fitted to the rear of the flat display module; and a coupler for coupling the front housing to the rear housing to fix the flat display module directly between the front housing and the rear housing.

In another aspect, the present invention provides a kit for assembling a display module-housing assembly for a flat display module, the kit including a front housing part configured to be fitted to the front of the flat display module; a rear housing part configured to be fitted to the rear of the flat display module; and a coupling part configured to couple the front housing part to the rear housing part to fix the flat display module directly between the front housing part and the rear housing part.

It is to be understood that both the foregoing general description and the following detailed description are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the embodiments of the present invention, examples of which are illustrated in the accompanying drawings. In the following descriptions, like elements are assigned the same reference numerals for simplicity.

Figure 4A:
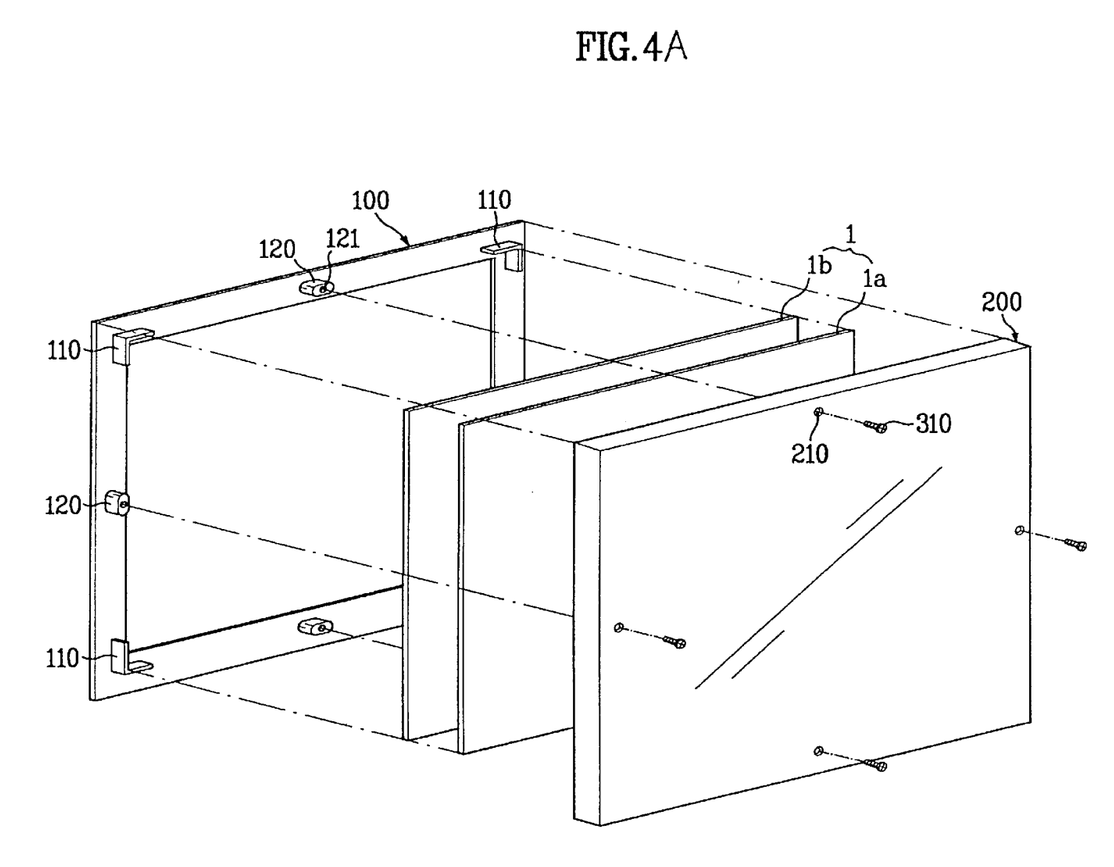
FIG. 4A is a perspective view of a display module-housing assembly in a disassembled condition according to a first embodiment of the present invention.
Figure 4B:
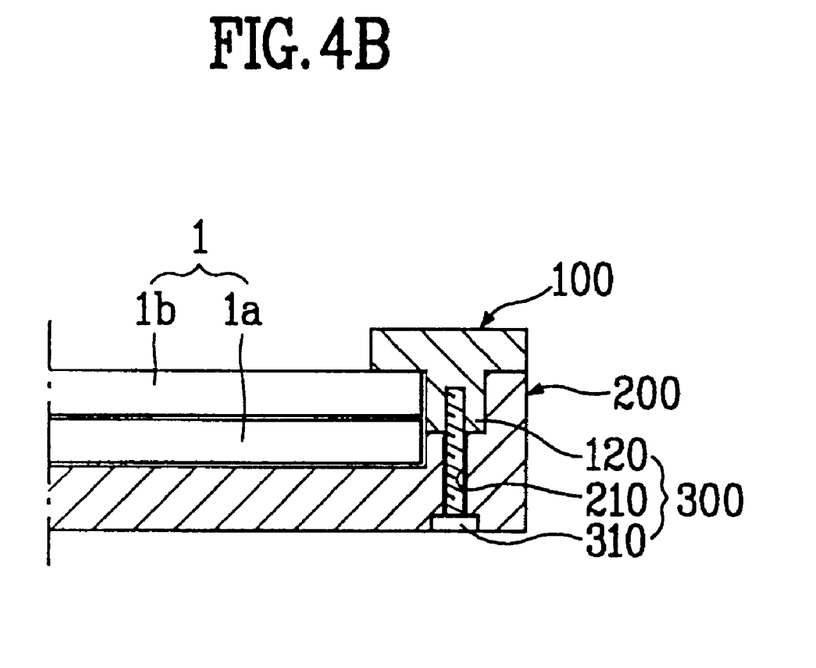
FIG. 4B illustrates a section view of a peripheral part of the display module-housing assembly according to the first embodiment shown in FIG. 4A.
Figure 5A:
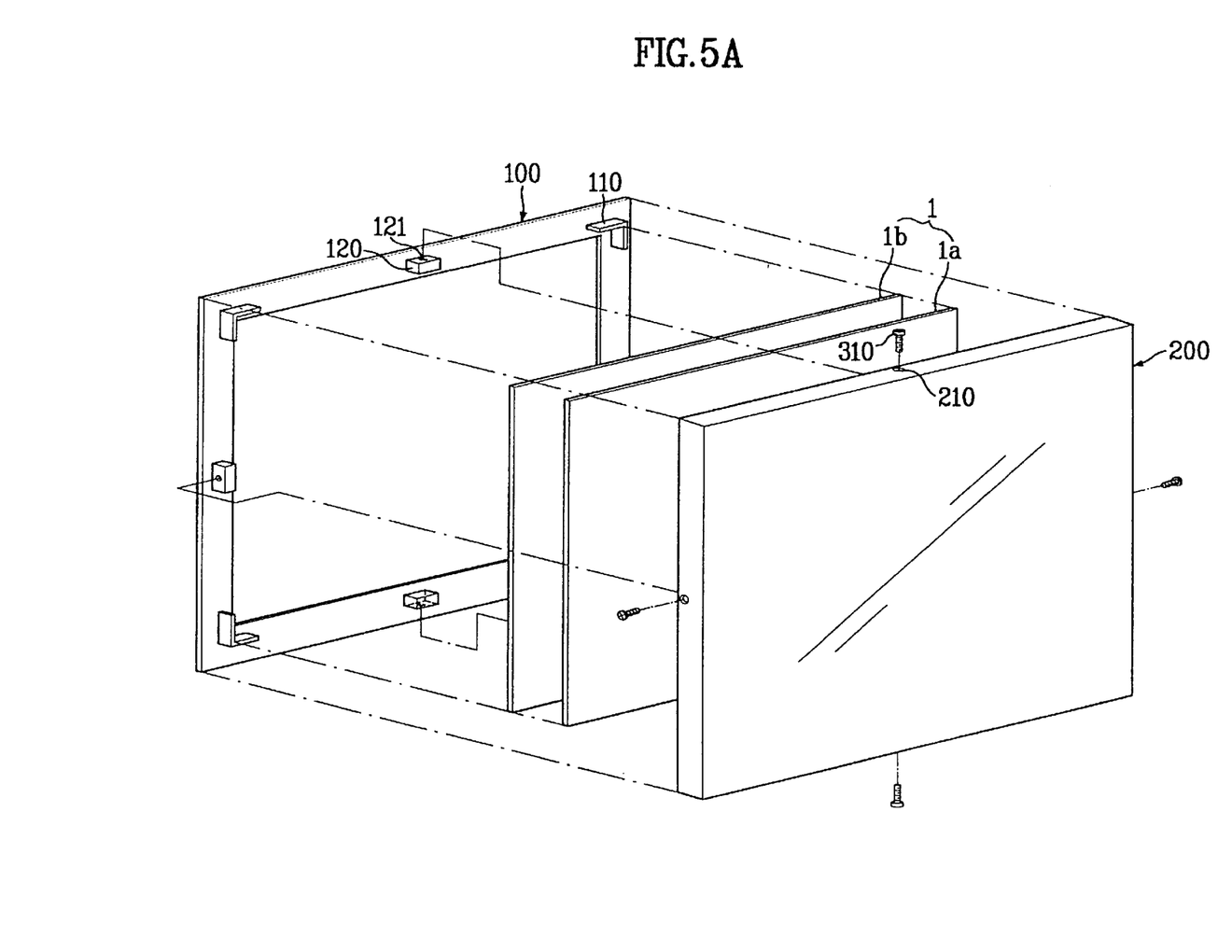
FIG. 5A is a perspective view of a display module-housing assembly in a disassembled condition according to a second embodiment of the present invention.
Figure 5B:
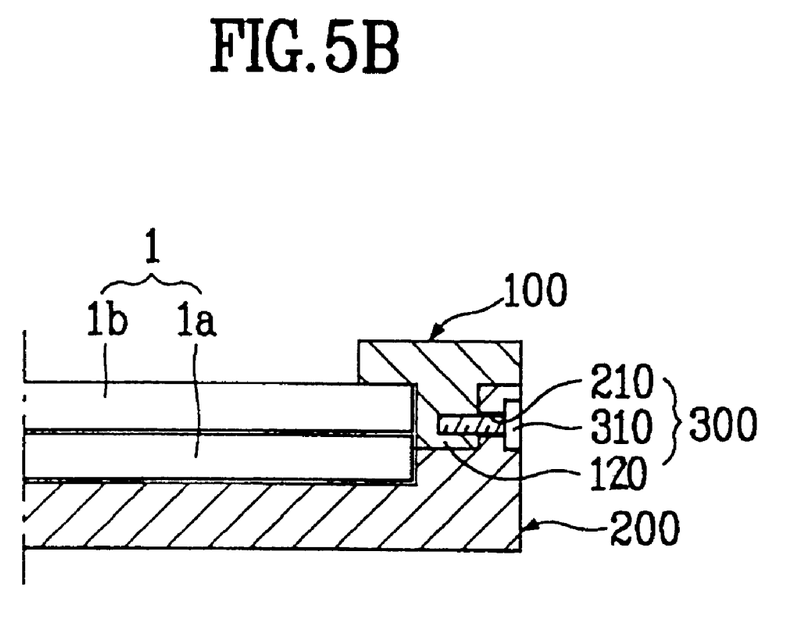
FIG. 5B illustrates a section view of a peripheral part of the display module-housing assembly according to the second embodiment shown in FIG. 4A.
Figure 6:
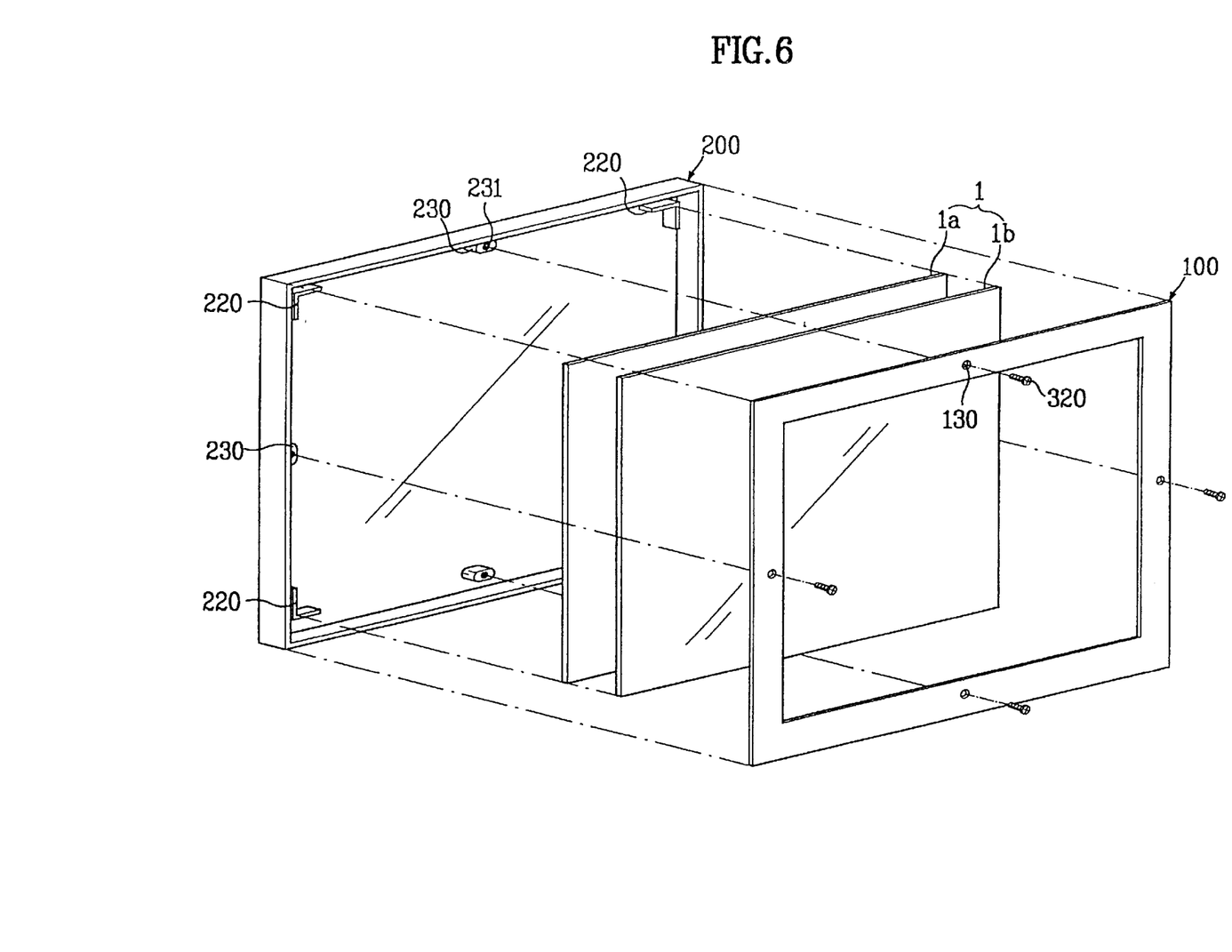
FIG. 6 is a perspective view of a display module-housing assembly in a disassembled condition according to a third embodiment of the present invention.

FIGS. 4A and 4B show a first embodiment of the present invention, FIGS. 5A and 5B show a second embodiment of the present invention, and FIG. 6 shows a third embodiment of the present invention. As shown in FIGS. 4A to 6, these examples of the display module-housing assembly according to the present invention include a flat display module 1 for displaying images, a display housing having a front housing 100 fitted to the front of the display module 1 and a rear housing 200 fitted to the rear of the display module 1, and a coupler for coupling the front housing 100 and the rear housing 200 to house the display module 1 directly between the front housing 100 and the rear housing 200.

The coupler may include a positioning part 110 formed on the inner surface of the front housing 100 for proper positioning of the display module 1 thereon, and a fastener (120, 121, 210, 310) for fastening the front housing 100 to the rear housing 200, as shown in FIGS. 4A and 5A, or a positioning part 220 formed on the inner surface of the rear housing 200 for proper positioning of the display module 1 thereon, and a fastener (130, 230, 231, 320) for fastening the front housing 100 to the rear housing 200, as shown in FIG. 6.

As shown in FIGS. 4A and 4B, the display module-housing assembly in accordance with the first embodiment of the present invention includes positioning parts 110 on the inner surface of the front housing 100 for proper positioning of the display module 1 thereon, and a fastener 300 for fastening the front housing 100 and the rear housing 200 to each other.

The positioning part 110 preferably has a bracket-like structure projecting from the inner surface of the front housing 100, as shown in FIGS. 4A. Moreover, this bracket-like structure may preferably be provided adjacent each corner of the front housing 100 to define the corners of the display module 1, which is to be mounted thereon.

The fastener 300 preferably includes a fastening boss 120 projecting from the inner surface of the front housing 100, a fastening hole 210 in the rear housing 200 at a position corresponding to the fastening boss 120, and a fastening member 310 to be engaged with the fastening boss 120 through the fastening hole 210.

The fastening boss 120 is preferably formed between the brackets 110 and at the outside of the area defined by the brackets 110 to avoid interference with the display module 1. The fastening boss 120 may preferably be disposed between adjacent brackets 110 at each side of the front housing 100 for balanced fastening. In a preferred mode, the fastening boss 120 has a screw hole 121, and the fastening member 310 is a bolt with a thread so that the rear housing 200 is fastened to the front housing 100 via engagement of the bolt 310 with the screw hole 121.

The display module 1 may be a liquid crystal type display module 1 (LCD module) including a backlight part 1a for light emission, and a liquid crystal panel 1b in front of the backlight part 1a. The liquid crystal panel 1b receives the light from the backlight part 1a and displays images.

A process for assembling the flat display module-housing assembly in accordance with the first embodiment of the present invention will be explained in more derails with reference to FIGS. 4A and 4B.

First, the liquid crystal panel part 1b and the backlight part 1a are set on the front housing 100 between the brackets 110. Then, the rear housing 200 is disposed over the front housing 100, and bolts 310 are inserted and fastened through the fastening holes 210 into the respective fastening bosses 120, thereby completing the fabrication of the flat display module-housing assembly.

FIGS. 5A and 5B show a second embodiment of the present invention. In the second embodiment, a screw hole 121 is formed in an outer side surface of a fastening boss 120, and a fastening hole 210 is formed in a side surface of in the rear housing 200 at a position corresponding to the screw hole 121 of the fastening boss 120.

A flat display module-housing assembly according to a third embodiment of the present invention is shown in FIG. 6. Referring to FIG. 6, the flat display module-housing assembly according to the third embodiment of the present invention includes a positioning part 220 on the inner surface of a rear housing 200 for proper positioning of the flat display module 1 thereon, and a fastener for fastening the front housing 100 to the rear housing 200.

It is preferable that the positioning part 220 is a bracket projecting from the inner surface of the rear housing 200, and more preferably, the bracket 220 is provided at each corner of the rear housing to define the corners of the display module 1, which is to be mounted thereon.

In a preferred mode, the fastener includes a fastening boss 230 projecting from the inner surface of the rear housing 200, a fastening hole 130 in the front housing 100 at a position corresponding to the fastening boss 230, and a fastening member 320 for fastening the front housing 100 to the rear housing 200 through the fastening hole 130 via the fastening boss 230.

The fastening boss 230 is preferably formed between the brackets 220 and at the outside of the area defined by the brackets 220 to avoid interference with the display module 1. The fastening boss 230 may preferably be disposed between adjacent buckets 220 at each side of the front housing 100 for balanced fastening. In a preferred mode, the fastening boss 230 has a screw hole 231, and the fastening member 320 is a bolt with a thread so that the rear housing 200 is fastened to the front housing 100 through engagement of the bolt 320 with the screw hole 231.

In this example, the display module 1 may also be a liquid crystal type display module (LCD module) including a backlight part 1a for light emission and a liquid crystal panel part 1b in front of the backlight part 1a. The liquid crystal panel part 1b receives the light from the backlight part 1a and displays images.

As explained above, the flat display module-housing assembly of the present invention provides direct assembly of a display module to a system display housing without use of a case. The advantages of the present invention includes the following. First, the weight and thickness of a system can be reduced, enabling the manufacture of light weighted, thin display systems. Furthermore, the workability is improved, and the production cost is reduced.

It will be apparent to those skilled in the art that various modifications and variations can be made in the flat display module-housing assembly of the present invention without departing from the spirit or scope of the invention. Thus, it is intended that the present invention cover the modifications and variations of this invention provided they come within the scope of the appended claims and their equivalents.

What is claimed is:

1. A display module-housing assembly comprising:
a liquid crystal flat display module for displaying images;
a display housing having a front housing and a rear housing, the front housing being fitted to the front of the flat display module, and the rear housing being fitted to the rear of the flat display module; and
a coupler for coupling the front housing to the rear housing to fix the flat display module directly between the front housing and the rear housing,
wherein the flat display module includes a backlight part for emitting light, and a liquid crystal panel part for receiving the light from the backlight part to display images, and
wherein the liquid crystal panel part is directly attached to the front housing, and the backlight part is directly attached to the rear housing.

2. The display module-housing assembly according to claim 1, wherein the coupler includes:
a positioning part on an inner surface of the front housing for positioning the flat display module; and
a fastener for fastening the front housing to the rear housing.

3. The display module-housing assembly according to claim 2, wherein the positioning part includes brackets projecting from the inner surface of the front housing.

4. The display niodule-housing assembly according to claim 3, wherein the bracket is formed adjacent each corner of the front housing.

5. The display module-housing assembly according to claim 2, wherein the fastener includes:
a fastening boss projecting from the inner surface of the front housing,
a fastening hole in the rear housing at a position corresponding to the fastening boss, and
a fastening member engaged with the fastening boss through the fastening hole.

6. The display module-housing assembly according to claim 5, wherein the fastening boss is formed outside of an area in which the flat display module is disposed.

7. The display module-housing assembly according to claim 6, wherein the fastening boss is formed between two adjacent brackets.

8. The display module-housing assembly according to claim 5, wherein the fastening member is a bolt and the fastening boss is a nut.

9. The display module-housing assembly according to claim 1, wherein the coupler includes:
a positioning part on an inner surface of the rear housing for positioning the flat display module; and
a fastener for fastening the front housing to the rear housing.

10. The display module-housing assembly according to claim 9, wherein the positioning part includes brackets projecting from the inner surface of the rear housing, and wherein the fastener includes:
a fastening boss projecting from the inner surface of the rear housing;
a fastening hole in the front housing at a positon corresponding to the fastening boss; and
a fastening member engaged with the fastening boss through the fastening hole.

11. A kit for assembling a display module-housing assembly for a liquid crystal flat display module, the kit comprising:
a front housing part configured to be fitted to the front of the flat display module;
a rear housing part configured to be fitted to the rear of the flat display module; and
a coupling part configured to couple the front housing part to the rear housing part to fix the flat display module directly between the front housing part and the rear housing part,
wherein the flat display module includes a backlight part for emitting light, and a liquid crystal panel part for receiving the light from the backlight part to display images, and
wherein the front housing part is configured to directly attach to the liquid crystal panel part, and the rear housing part is configured to directly attach to the backlight part.

12. The kit according to claim 11, wherein the front housing part includes a positioning part on its inner surface for positioning the flat display module.

13. The kit according to claim 12, wherein the front housing part includes brackets projecting from the inner surface of the front housing part.

14. The kit according to claim 13, wherein the bracket is disposed adjacent each corner of the front housing part.

15. The kit according to claim 11, wherein the rear housing part includes a positioning part on its inner surface for positioning the flat display module.

16. The kit according to claim 15, wherein the positioning part includes brackets projecting from the inner surface of the rear housing part.

17. The kit according to claim 16, wherein the bracket is disposed adjacent each corner of the rear housing part.

18. The kit according to claim 12, wherein the coupling part includes a fastening part configured to fasten the front housing part to the rear housing party.

19. The kit according to claim 15, wherein the fastening part includes a threaded part.

20. The kit according to claim 11, further comprising the flat display module to be assembled into the display module-housing assembly.

* * * * *

UNITED STATES PATENT AND TRADEMARK OFFICE
CERTIFICATE OF CORRECTION

PATENT NO.    : 6,512,558 B2
DATED         : January 23, 2003
INVENTOR(S)   : Sung Kon Kim It is certified that error appears in the above-identified patent and that said Letters Patent is hereby corrected as shown below:

<u>Title page,</u>
Item [30], Foreign Application Priority Data, should be changed from "1-32613" to -- 2001-32613 --

Signed and Sealed this

Tenth Day of February, 2004

JON W. DUDAS
*Acting Director of the United States Patent and Trademark Office*

UNITED STATES PATENT AND TRADEMARK OFFICE
CERTIFICATE OF CORRECTION

PATENT NO.   : 6,512,558 B2
DATED        : January 28, 2003
INVENTOR(S)  : Sung Kon Kim

It is certified that error appears in the above-identified patent and that said Letters Patent is hereby corrected as shown below:

<u>Title page,</u>
Item [30], Foreign Application Priority Data, should be changed from "1-32613" to -- 2001-32613 --

This certificate supersedes Certificate of Correction issued February 10, 2004.

Signed and Sealed this

Eleventh Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,512,558 B2  
DATED : January 28, 2003  
INVENTOR(S) : Sung Kon Kim It is certified that error appears in the above-identified patent and that said Letters Patent is hereby corrected as shown below:

<u>Title page,</u>  
Item [30], Foreign Application Priority Data, should be changed from "1-32613" to -- 2001-32613 --

This certificate supersedes Certificate of Correction issued February 10, 2004.

Signed and Sealed this

Twenty-ninth Day of June, 2004

JON W. DUDAS  
*Acting Director of the United States Patent and Trademark Office*